United States Patent
Tice et al.

(10) Patent No.: US 6,292,541 B1
(45) Date of Patent: Sep. 18, 2001

(54) LINE SHUNT AND GROUND FAULT APPARATUS METHOD

(75) Inventors: Lee D. Tice, Bartlett; Robert J. Clow, North Aurora; Manley S. Keeler, Naperville, all of IL (US)

(73) Assignee: Pittway Corporation, Chicago, IL (US)

( * ) Notice: Subject to any disclaimer, the term of this patent is extended or adjusted under 35 U.S.C. 154(b) by 0 days.

(21) Appl. No.: 09/189,393

(22) Filed: Nov. 10, 1998

(51) Int. Cl.$^7$ .................................................. H04M 1/24
(52) U.S. Cl. ................................. 379/22.03; 379/22.07; 379/24; 379/27.06; 379/29.01; 324/500; 340/825.36
(58) Field of Search .................................. 379/1, 2, 6, 8, 379/24, 25, 26, 27, 29, 31, 34; 340/511, 661, 590, 825.36, 870.04; 324/528, 530

(56) References Cited

U.S. PATENT DOCUMENTS

| | | | |
|---|---|---|---|
| 4,209,666 | * | 6/1980 | Lawton .................................. 370/13 |
| 4,459,437 | * | 7/1984 | Gabry et al. ............................. 379/2 |
| 4,470,047 | * | 9/1984 | Vogt et al. ........................ 340/825.36 |
| 4,528,427 | * | 7/1985 | Gadonna et al. ....................... 379/26 |
| 4,837,519 | * | 6/1989 | Lopetrone et al. .................... 324/529 |
| 4,916,432 | * | 4/1990 | Tice et al. ............................. 340/518 |
| 4,937,851 | * | 6/1990 | Lynch et al. ............................. 379/6 |
| 4,954,809 | | 9/1990 | Right et al. ........................... 340/516 |
| 5,400,203 | | 3/1995 | Tice ...................................... 361/62 |
| 5,550,894 | * | 8/1996 | Charland ................................. 379/2 |
| 5,644,293 | | 7/1997 | Right et al. . |
| 5,802,144 | * | 9/1998 | Laird et al. ............................ 379/32 |
| 5,926,529 | * | 7/1999 | Hache et al. ......................... 379/114 |
| 5,946,373 | * | 8/1999 | Harris ................................... 379/26 |
| 5,995,588 | * | 11/1999 | Crick .................................... 379/22 |
| 6,026,145 | * | 2/2000 | Bauer et al. ........................... 379/26 |

FOREIGN PATENT DOCUMENTS 0 287 369   10/1988   (EP) .

* cited by examiner

Primary Examiner—Binh Tieu
(74) Attorney, Agent, or Firm—Rockey, Milnamow & Katz, Ltd.

(57) ABSTRACT

A system and method to detect ground faults in a multi-processor communication system that includes a communications link that extends between the processors. The processors isolate different sections of the link. Measurements made with different isolated sections establish the location of the fault. The processors can also make measurements of the link to establish the magnitude of a shunt impedance on the link. Where an abnormal value of shunt impedance is detected, the respective devices can activate or deactivate solid state isolation circuitry to disconnect a section of the link exhibiting the abnormal level of shunt impedance.

40 Claims, 5 Drawing Sheets

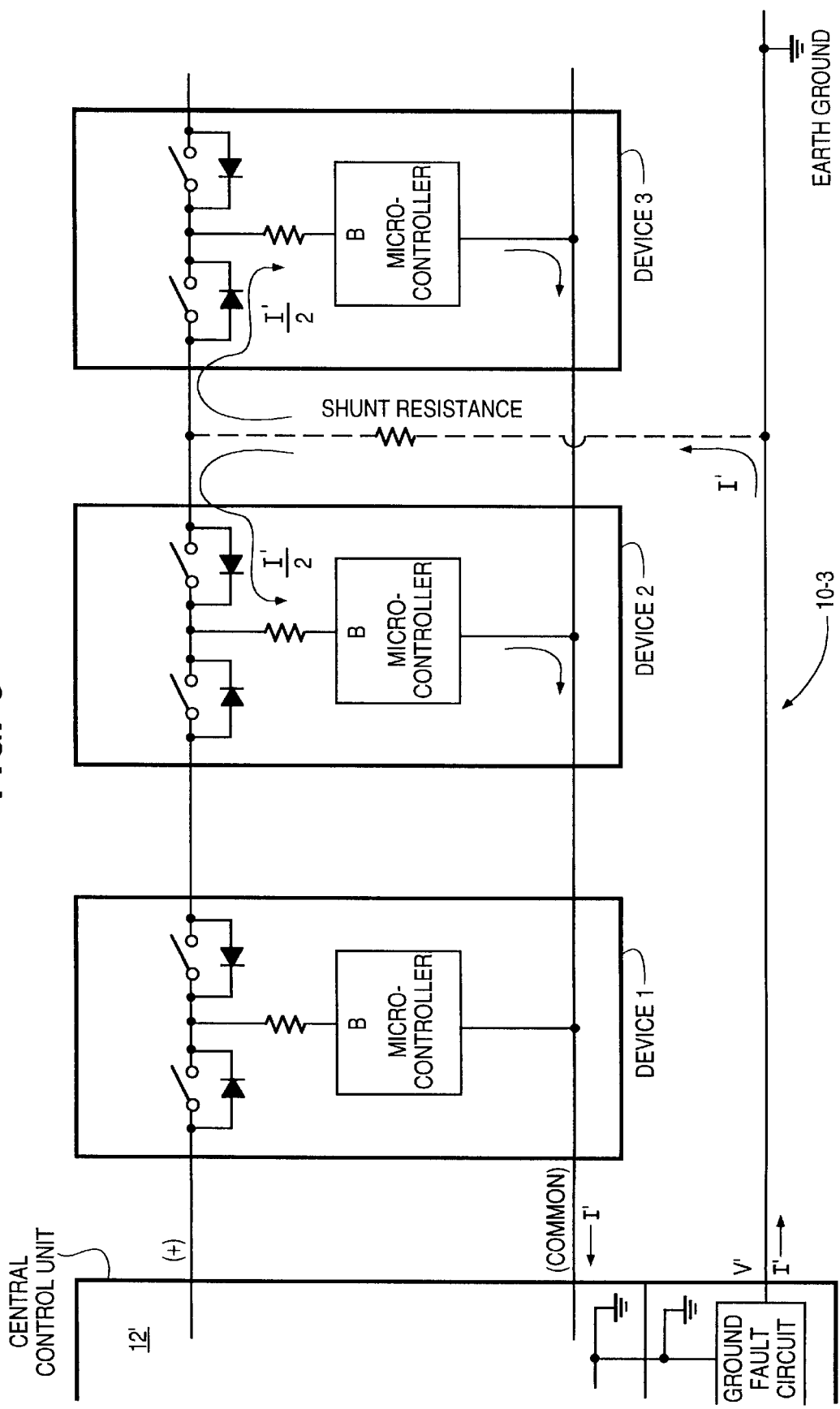

LINE SHUNT AND GROUND FAULT APPARATUS METHOD

FIELD OF THE INVENTION

The invention pertains to diagnostic devices and methods for use with communication links. More particularly, the invention pertains to such devices and methods which can be used to determine the presence or absence of shunt impedances as well as the presence or absence of ground faults on communication links.

BACKGROUND OF THE INVENTION

Multiprocessor communication systems which provide bidirectional communication capabilities for each of the processors using a bidirectional communication link are known. Such systems are often associated with alarm or monitoring functions.

One known form of such a system incorporates a common control unit which is connected to a two-wire electrical cable which extends throughout a region to be monitored. A plurality of detectors can be coupled across the wires of the link at locations corresponding to portions of the region to be monitored. Additionally, output devices can also be coupled across the wires of the link and can be used to provide various output functions such as energizing or de-energizing solenoids or energizing or de-energizing audible or visual annunciators.

It has also been recognized that such communication links at times exhibit deteriorating performance due to shunt impedances or ground faults. While there have been approaches developed in the past which attempt to establish the location of one or more such conditions on Class A loops, it would be desirable to ascertain the existence of shunt impedances across the wires of the link or the location of ground faults in other link configurations. Preferably, it would be desirable to provide such functionality without having to substantially increase the base cost of such systems for a given number of detectors. Additionally, it would be preferred if the desired functionality can be provided without substantially increasing system complexity.

SUMMARY OF THE INVENTION

A multi-processor communication system, in one aspect, includes a common communication link which could be implemented as a two-wire cable. Coupled to the link are the members of a plurality of electrical devices some of which might be substantially identical.

Typical electrical devices would include ambient condition detectors such as smoke detectors, position detectors, motion detectors, gas detectors, humidity detectors, and the like. Other types of electrical devices could be used for energizing or de-energizing solenoids so as to implement output functions which could include locking or unlocking, opening or closing doors or windows, energizing or enabling audible or visual output devices of various types to convey messages, warnings or the like. In another aspect, the detectors can be clustered on one communication link, and some of the output devices, if desired, clustered on another communications link.

The electrical devices can each include a local control circuit, which could be implemented as a programmed processor, and associated instructions. In one aspect, the local control circuit is coupled to a solid state or mechanical switch which can be used to open circuit the communication link in the vicinity of the electrical unit. A common control unit, if present, can in turn include similar solid state or mechanical switches which under the control of electrical circuitry therein can isolate the communication link from that control unit.

In order to measure the shunt resistance of the communication line, the devices contain drive circuitry to drive a current across the two wires of the communication line. The current is driven in a manner that the devices connected across the wires will not interfere with the measurement of the shunt resistance across the two wires.

The devices measure the voltage drop produced across the wires by the current and determine if the line shunt resistance is greater than a predetermined value. If the shunt resistance is lower than the predetermined value, a trouble indication can be generated.

In a preferred aspect, the current is driven in a polarity opposite to the polarity present when delivering power to the devices. In this manner, each device appears to be an open circuit or at least a very large impedance when the polarity is reversed. The voltage developed across the line will then be determined by the line shunt resistance.

In another aspect, the current can be driven with the same polarity as the polarity present when delivering power to the devices. However, in this case, it would be driven at very low value such that the voltage developed across the wires of the communication link is less than the voltage value required to deliver power to the devices. Since the devices do not have sufficient voltage to draw power from the line, the voltage on the line will be determined by the line shunt resistance.

In a preferred apparatus, each device also contains an isolation circuit such that it can open circuit the link. The isolation circuit can be implemented using solid state semiconductor switches.

Since each device open circuits the link, each device only checks the portion of the link between itself and an adjacent device. If a shunt resistance across the two wires of the communication link is less than a predetermined value, a trouble indicator can be generated and the device address indicates the location of the shunt resistance. A voltage drive could be substituted for a current drive since these parameters are related.

When a low shunt resistance has been indicated, the device can be commanded to open circuit the link to isolate the section of the communication link that has a low shunt resistance. This will prevent it from adversely affecting the communication process.

In many systems, the communication link is not connected to the earth ground or external shielding around the link. A resistive leakage path, or ground fault, can occur from either or both wires of the communication link to earth ground. This may potentially cause communication problems. It would be desirable to be able to identify that this leakage resistance to earth ground, or ground fault, exists prior to encountering communications problems.

A preferred method includes checking to determine if a link exhibits a ground fault. In one embodiment, the communication link includes two conductors.

One conductor is connected to all devices and cannot be open circuited by the devices. Each device has a capability to open circuit the second conductor.

To test the link, the devices open circuit the second conductor at spaced apart locations on the link. When a respective device is between the ground fault and a predetermined unit, the ground fault will disappear relative to the predetermined unit.

When the ground fault is between the unit and the device, the ground fault will be detected by the unit. By determining which device is closest to the ground fault and still between the ground fault and the unit, the location of the ground fault can be determined.

The predetermined unit can correspond to another device. Alternately, if the system includes a common control unit, coupled to the link, to implement various system-wide communication functions, the predetermined unit can correspond to the common control unit.

A predetermined searching pattern can be used to determine the location of the ground fault. A binary search pattern will find the ground fault with the least number of steps.

One method of locating a ground fault to one of the conductors of a communication link includes selecting an initial location on the link. Where the initial location corresponds to an end of the link, another displaced location on the link is selected. The link is open circuited at the another location.

Each of the segments can then be tested by use of voltage-type test signals to determine which segment includes the fault. Relative of this segment which indicates or includes a fault, another displaced location is selected and the line is open circuited. Each of the shortened line segments is then tested to determine which segment includes the fault. As noted above, a binary search pattern can be used and will determine the location of the fault in a minimal number of steps.

In yet another aspect, the isolation switches of each of the electrical units can be opened. An attempt can then be made to cause a test current to flow between an earth ground and the common conductor of the communication line which is not open circuited. The presence of this test current can be detected using a ground fault detect circuit coupled between the earth ground and the continuous conductor of the communications link. The current can be applied by either the electrical units, acting in parallel, or from another source such as the ground fault detect circuit or a supply elsewhere in a common control unit coupled to ends of the communication link.

In either instance, the presence of a ground fault between the open circuited conductor of the link and the earth ground can be detected by one or more adjacent electrical devices. Non-adjacent electrical devices are isolated from the ground fault due to the open circuited isolation switches of the adjacent electrical devices. Hence, the location of the ground fault can be undetermined, between two adjacent electrical devices. In that instance, the ground fault can be isolated from the communication link by maintaining the isolation switches of the two adjacent electrical devices in their respective open circuit states and short-circuiting the isolation switches of the remaining electrical units thereby enabling normal communication to re-initiated.

Numerous other advantages and features of the present invention will become readily apparent from the following detailed description of the invention and the embodiments thereof, from the claims and from the accompanying drawings.

BRIEF DESCRIPTION OF THE DRAWINGS

FIG. 5 is a block diagram of yet another form of the system of FIG. 1 which can be used to locate a ground fault and

DETAILED DESCRIPTION OF THE PREFERRED EMBODIMENTS

Figure 1:
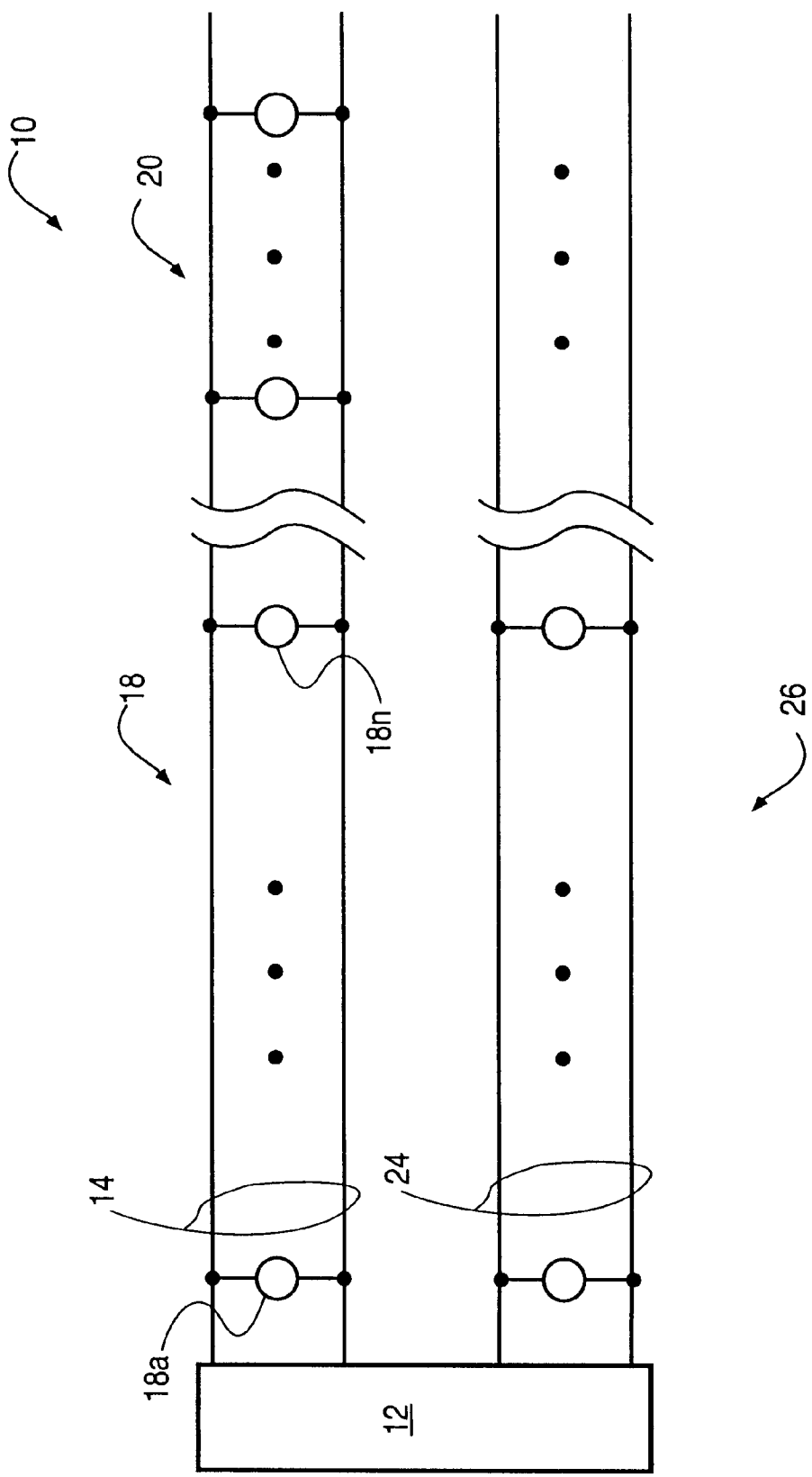
FIG. 1 is a block diagram of a communication system in accordance with the present invention.

While this invention is susceptible of embodiment in many different forms, there are shown in the drawing and will be described herein in detail specific embodiments thereof with the understanding that the present disclosure is to be considered as an exemplification of the principles of the invention and is not intended to limit the invention to the specific embodiments illustrated.

FIG. 1 illustrates a multi-processor communications system 10 which can be used for monitoring a plurality of conditions in one or more regions to be supervised. As illustrated, the system 10 includes a common control unit 12 which could be implemented as one or more interconnected programmed processors and associated, prestored instructions.

The unit 12 includes an interface for coupling, for example, to a communications medium 14, illustrated in FIG. 1 for exemplary purposes only as an optical or electrical cable.

Coupled to medium 14 is a plurality of ambient condition detectors 18 and a plurality of control or function units 20. It will be understood that the arrangement of the members of the pluralities 18 and 20 relative to the medium 14 is not a limitation of the present invention. The members of the plurality 18 can include intrusion sensors, position sensors, gas sensors, fire sensors such as smoke sensors, thermal sensors or the like, all without limitation. The members of the plurality 20 can include solenoid actuated control or function implementing units, display devices, printers or the like.

Also coupled to the control unit 12 via a medium 24, illustrated for example as a pair of electrical cables, is a plurality 26 of output devices. These could include audible or visible output devices without limitation, speech output devices and the like. The devices 26 are intended to broadcast a message, which might indicate alarm condition, in one or more predetermined regions.

It will be understood that the purpose for which the system 10 is being used is not a limitation of the present invention. The invention can be incorporated into local area networks which, for example, only transfer information between various devices coupled thereto. The invention can also be incorporated into peer-to-peer type communications systems which do not incorporate an element that corresponds to the common control unit 12 without departing from the spirit and scope of the present invention.

Figure 2:
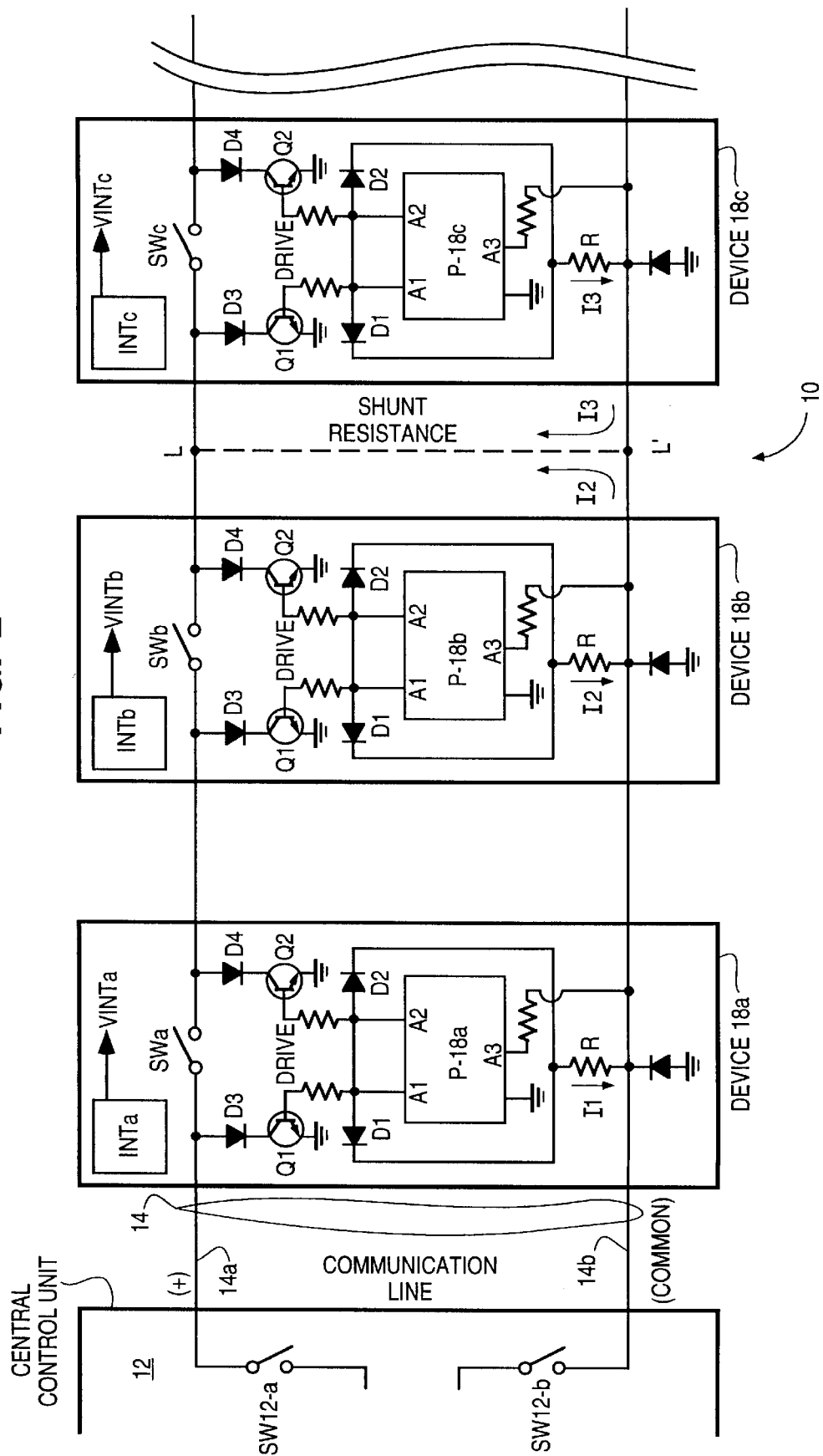
FIG. 2 is a block diagram of a portion of the communication link of FIG. 1 illustrating additional details of electrical units coupled thereto and circuitry for locating the presence of a shunt resistance.

FIG. 2 illustrates a system and method for locating a shunt resistance. Three devices 18a, b, c and the control unit 12 are illustrated. The following comments also apply to members of the plurality 20, 26.

Each device, such as 18a, includes an isolator switch SWa. Each of the devices 18a, b . . . n, 20a, b . . . n, 20a . . . 20m includes a control element which can be implemented, at least in part as a programmed processor P-18a,-18b . . .

18*n* and P-20*a*, -20*b* . . . -20*m* and associated instructions. Alternately, the members of the pluralities 18, 20, 26 can be implemented using various forms of hardwired logic.

The processors each include output control ports or drivers $A_1$, $A_2$ and analog input port $A_3$. The analog receiver $A_3$ includes an A/D converter. Alternately, the A/D converter can be a separate circuit external to the respective processor. The converter is used to detect a threshold value. The drivers (A1, A2) could be a single drive pin from the respective processor or the output of an external drive circuit.

Each of the devices 18*a* . . . 20*m* includes a local power supply such as INTa, INTh . . . . Each local supply can receive electrical energy from link 14. Alternately, each such supply can receive energy from another source such as a battery.

During the shunt test, all switches SW12-*a*, SW12-*b*, SWa . . . SWn are opened. The conductor 14*a* is thus open circuited at each device, including at the control unit 12.

Next, the drive circuits (A1, A2) are turned ON so that a current (I1, I2, I3) flows to the conductor 14*b*. Current I1 has no return path to the internal ground of device 18*a*. Hence, the conductor 14*b* is driven to a high positive voltage relative to that device's internal ground. This voltage is measured at input port A3.

If there is no shunt, all devices will produce a high positive voltage relative to their internal grounds. This indicates that there is no shunt resistance present across the link 14.

On the other hand, if there is a shunt resistance at L to L' between device 18*b* and device 18*c*, then there will be a return path for the I2 and I3 currents to return to their respective internal grounds through Q2 and Q1 respectively of these devices. The amplitude of voltage developed across the link 14 (across the shunt resistance) is then a function of the internal resistance R in the current path in each device. [V(common)−V(+)]=[VINTi−V(D1)−V(D3)−V(Q1)]* (shunt resistance)/(R/2+shunt resistance).

The value of R is divided in two because device 18*b* is in parallel with device 18*c* so that R values are effectively in parallel. If the voltage developed across the link 14 is lower than a predetermined value, then the devices will recognize that a shunt resistance is present with a value that is lower than a predetermined value. A trouble indication can be generated. The devices may then leave their respective isolator switch, SWa, SWb . . . , open to prevent the shunt impedance from affecting communications on the two conductors 14*a, b*.

All devices that do not detect a low shunt resistance, will close or short circuit their respective isolator switch. This will restore the connection of the conductor 14*a* to the other devices. Likewise, the control unit 12 will close SW12-*a*, -*b* and restore power delivery and communication to the link 14. Only switches SWb, SWc will stay open.

In many cases, a second pair of wires is connected from the last device, such as 20*m*, back to the control unit 12 so that power and communications can then reach device 18*c*. All devices will then receive power to continue normal operation. However, the shunt resistance from L to L' is isolated from the communication line.

Figure 3:
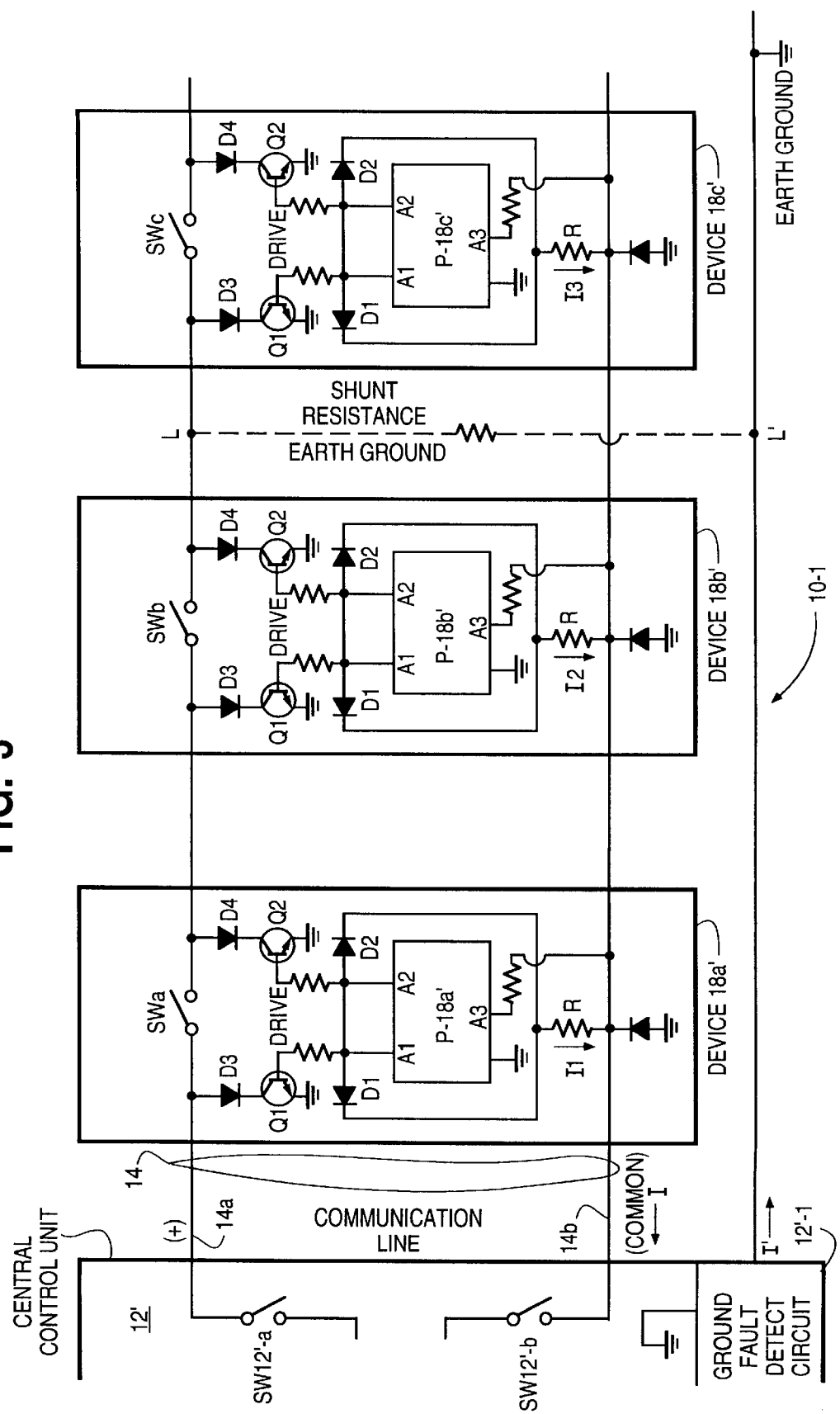
FIG. 3 is a block diagram of a portion of an alternate form of the system of FIG. 1 configured so as to locate a detected ground fault.

FIG. 3 illustrates a system 10-1 for detecting the location of a ground fault. Common components of system 10-1 have been assigned the same identification numerals as in FIG. 2. In FIG. 3, processors P-18*a'* . . . P-18*n'* could be implemented using processors P-18*a* . . . P-18*n* as previously discussed relative to FIG. 2 but with expanded or additional instructions to carry out a ground fault test function.

In the system 10-1 control unit 12' includes control switches SW12'-*a* and SW12'-*b*. These switches, could be implemented as field-effect transistors, bipolar transistors or any other type of controllable solid state or mechanical switch. The same comments apply to switches SWa, SWb, SWc . . . .

Switches 12'-*a*, 12'-*b* open circuit respective conductors 14*a, b*. Unit 12' also includes ground fault detect circuitry 12'-1. The structure and operation of circuitry 12'-1, which could be implemented in part with pre-programmed instructions used to control one or more processors in unit 12', are discussed below.

One ground fault locating method involves starting at the unit 12' and progressing out therefrom one device at a time. The steps include opening and closing the respective isolator switches SWa, SWb, SWC . . . and, therefore, open circuiting and short circuiting the conductors 14*a* at each device, until the ground fault no longer disappears during the time when the device open circuits the conductor 14*a*. This identifies the device closest to the ground fault which is still between the ground fault and the control unit 12. If the ground fault is after the first device, then only two checks are needed. If the ground fault is after 500 devices, 501 checks will be needed. This method can be used with T-taps on the communication link.

In another method, the devices can be configured to drive a current into the earth ground. The location of the earth ground shunt resistance (ground fault) at L to L' can be determined.

During this test SW12-*a* is opened and SW12*b* is closed in the control unit 12. The isolation switch SWi in each device open circuits the conductor 14*a* at each device. Then, each device drives a current (I1, I2, I3) into the conductor 14*b* which can then flow to the control unit(I) and out to the earth ground (I'). If there is no earth ground shunt resistance, then I'=0 and therefore I1=0, I2=0, and I3=0.

On the other hand, if there is an earth ground shunt resistance at L to L', then current can flow through the earth ground shunt resistance to complete the current path back to devices adjacent to point L. In this case, I'=I2+I3, I1=0 because the isolator SWb in device 18*b'* prevents formation of a complete path back to device 18*a'*.

Devices 18*b'* and 18*c'* both sense that a current is flowing internally and set an earth ground fault indicator or trouble signal. This trouble signal can then be transmitted to the control unit 12' or some other device for indication and display. Since both device 18*b'* and device 18*c'* indicate a ground fault, then the earth ground shunt resistance L to L' is determined to be between device 18*b'* and device 18*c'*.

Figure 4:
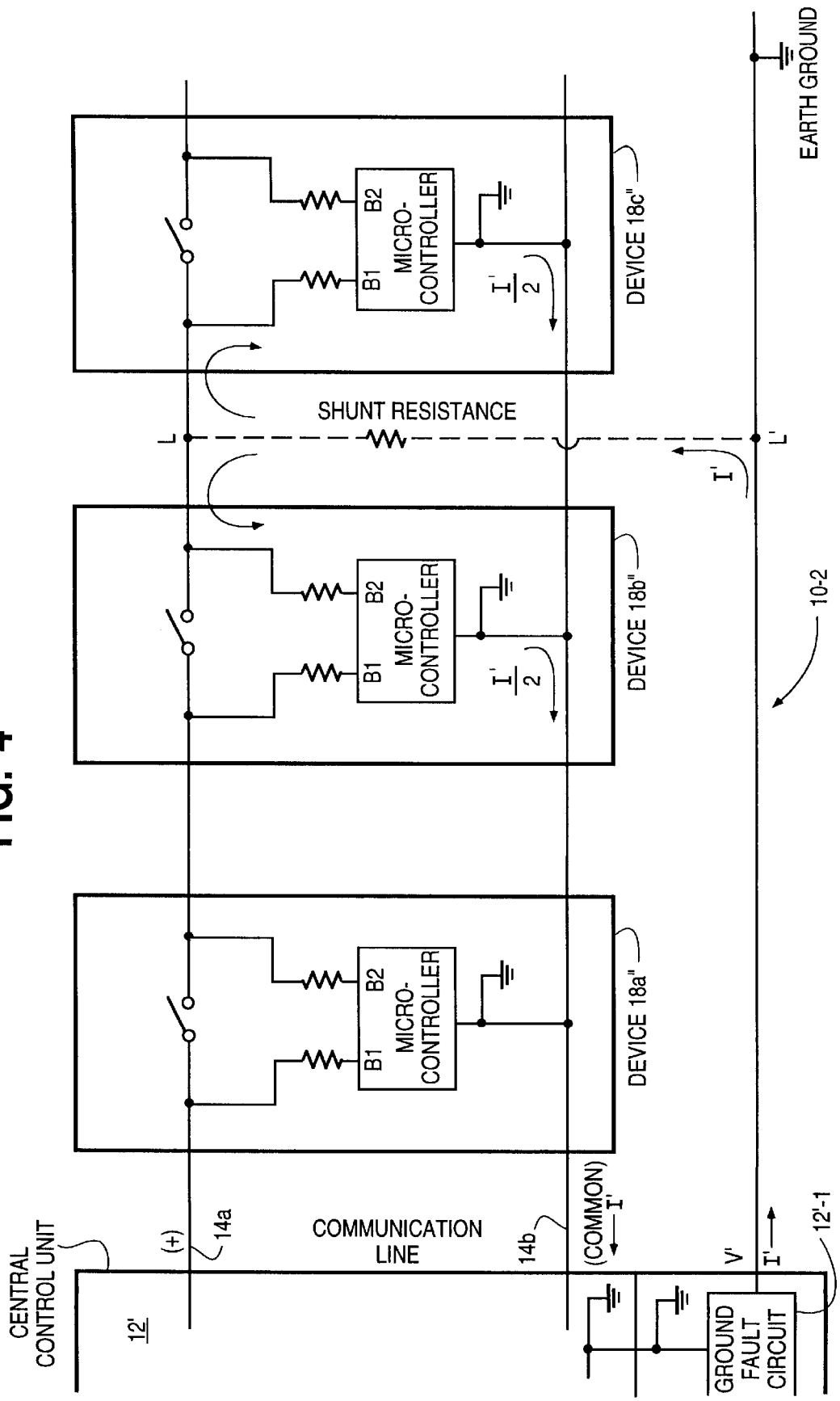
FIG. 4 is a block diagram of a portion of another form of the system of FIG. 1 configured to carry out an alternate form of ground fault locating.

In another system 10-2 and method illustrated in FIG. 4, a ground fault circuit 12'-2 is connected between the control unit 12' and earth ground. The ground fault circuit 12'-2 applies a voltage V' to earth ground. This voltage (V') may be applied continuously as a pulse or in some other form, including modulated signals.

If a ground fault is present, then, a current (I') will flow into the earth ground connections. The ground fault location check is made when the isolator switches SWa, SWb . . . are opened.

When the isolator switches SWa, SWb . . . are open, current I' will then flow through the shunt resistance, L to L', and create a voltage at the input circuits B2 of device 2 and B1 of device 3. The current will flow through the devices to the conductor 14*b* and return to the control unit 12' and the ground fault circuit 12'-1.

Device 18*a* will not see any voltage at its input because the isolators prevent any currents from flowing to the conductor 14a coupled to device 18a". Devices 18b" and 18c" then will report that they received ground fault signals. This will determine the location of the ground fault.

If there are isolators in the negative wire and not in the positive wire, then the same principles apply. The ground fault circuit can apply a voltage (V") and a detection means in the devices senses a voltage developed by the devices adjacent to the shunt resistance. A negative V' can be applied and the devices sense a voltage at the inputs B1 or B2.

Two isolators can be used with each device if they have diodes across each of them so that current can flow in one direction as shown in FIG. 5. The basic concept is that the isolators prevent other devices from detecting a ground fault signal.

Only the device(s) adjacent to the shunt resistance connection detect the ground fault signal. If there are isolators in the negative wire and not in the positive wire, then the same principles apply. The ground fault circuit can apply a voltage (V') and a detection means in the devices senses a voltage developed by the devices adjacent to the shunt resistance. A negative V' can be applied and the devices sense a voltage at the input B.

Other equivalent sensing means can be used such that only the devices adjacent to the shunt resistance detect the ground fault circuit signals when the isolators are open. Other than a pulse, modulated waveforms or other signals can be applied to the earth ground. Either a positive or negative voltage (V') can be used, depending upon the type and polarity of the input circuit in the devices).

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed:

1. A method of determining the location of a ground fault on a communication line having a plurality of substantially identical operational units couple thereto wherein the units carry out a non-test function and wherein the line is adapted to be independently open circuited at a plurality of spaced apart locations by the units, the method comprising:
    selecting a location displaced from at least one end of the line thereby forming two segments;
    open circuiting the line at the selected location using at least one unit adjacent to the location;
    testing at least one contiguous line segment by applying at least one selected test voltage at the location to determine which segment includes the fault;
    relative to the segment with the fault, repeating the above steps, successively shortening the segment which includes the fault until the fault has been located.

2. A method as in claim 1 wherein the segment lengths are succesively shortened using a binary search pattern until the location of the fault can be established.

3. A method as in claim 1 which includes selecting an end of the line and wherein the testing step indicates if the fault is located between the selected end and the displaced, selected location.

4. A method as in claim 3 wherein the location of the fault can be established relative to an open circuit.

5. A method as in claim 3 wherein a detected test current is compared to an expected test current to identify a segment having a fault.

6. A method of determining the location of a ground fault on a communication line having a plurality of stanstially identical operational units coupled thereto wherein the units carry out a non-test function and wherein the line is adapted to be independently open circuited at a plurality of spaced apart location by the units, the method comprising:
    selecting a plurality of locations displaced from at least one end of the line thereby forming a segment;
    open circuiting the line at the plurality of displaced locations using at least one unit adjacent to each of the locations;
    testing at least one contiguous line segment by applying at least one selected test voltage at one of the locations and attempting to initiate a current flow between an earth ground, via a ground fault, and a portion of the open circuited line whereby the location of the ground fault is established by the location of the portion of the open circuited line; and
    relative to the segment with the fault, repeating the above steps, successively shortening the segment which includes the fault until the fault has been located.

7. A method as in claim 6 wherein the current flow is initiated at the earth ground.

8. A method as in claim 6 wherein the current flow is initiated by a voltage source coupled across first and second conductors wherein one conductor is the open circuited line.

9. A method as in claim 3 wherein a binary search pattern is used to successively shorten the segment lengths.

10. A method of determining the location of a ground fault on a multi-conductor communication link having first and second ends, the method comprising:
    open circuiting one conductor of the link at a plurality of locations between the ends;
    applying a test voltage at at least one location and attempting to cause a test current to flow between another conductor of the link and an earth ground; and
    establishing the location of the fault in response to a detected current flowing through the fault.

11. A method as in claim 10 wherein members of a plurality of electrical devices are coupled across the first and second conductors and wherein at least one of the devices attempts to couple at least part of the test current to the second conductor by impressing a selected voltage across the first and the second conductors.

12. A method as in claim 10 wherein the detected fault will be located adjacent to at least one electrical device which detects a flow of at least part of the test current.

13. A method as in claim 10 wherein the test voltage is applied between the second conductor and the earth ground.

14. A method as in claim 10 which includes providing a plurality of electrical devices coupled between the first and the second conductors of the link.

15. A method as in claim 14 where all devices open circuit the first conductor when a predetermined device drives a voltage across the conductors.

16. A method as in claim 14 where only predetermined devices open circuit the communication first conductor when a predetermined device drives a voltage across the conductors.

17. A method as in claim 14 where the voltage across the conductors is a result of sourcing a current across same.

18. A method, as in claim 16 where the predetermined devices are altered in a predetermined pattern to search for the location of the ground fault.

19. In a two wire communication system with multiple installed devices, a method of determining the location of a ground fault on one of the communication lines comprising:
    measuring current flowing from the ground to a selected unit;

open circuiting one of the communication lines at a plurality of locations using the devices installed on the communication wiring between the ends thereof;

determining if the measured current flowing from the ground to the selected unit is coincident with a selected device open circuiting the communication positive wire.

20. In a two wire communication system with multiple installed devices, a method of determining the location of a ground fault on one of the communication lines comprising:

measuring current flowing from the ground to a selected unit;

open circuiting one of the communication lines at a plurality of locations, in sequence, starting at a selected location on the lines until the ground fault disappears using the devices installed on the communication wiring between the ends thereof;

determining if the measured current flowing from the ground to the selected unit is coincident with a selected device open circuiting the communication positive wire.

21. A method as in claim 20 which includes locating the ground fault between a) the last device which opened circuited the communication wire, during which time the ground fault disappeared and b) the second to last device which open circuited the communication line during which the ground fault did not disappear.

22. A method as in claim 19 where the devices open circuit one of the communication lines in a predetermined pattern to search for the location of the ground fault.

23. A method as in claim 22 where the pattern comprises a binary search pattern.

24. A method as in claim 23 wherein implementing the binary search pattern comprises causing the middle device on a segment to open circuit the line, and if the ground fault disappears, causing the unit that is half way along the segment, in a selected direction to open circuit the line, if the ground fault does not disappear, causing the unit that is halfway on the segment opposite the selected direction to open circuit the communication line, this pattern repeats until the ground fault location is determined.

25. A method of determining the amount of leakage across a pair of conductors using device(s) coupled to the conductors between the ends thereof comprising: sourcing or driving a current across the conductors in a direction where the device(s) do not interfere with measurements of the conductors; measuring the voltage developed across the conductors; and comparing that voltage to a predetermined value stored at the devices that represents excessive shunting across the conductors wherein the devices open circuit sections of at least one of the conductors and make line leakage measurements of the open circuited sections.

26. A method of determining the amount of leakage across a pair of conductors using device(s) coupled to the conductors between the ends thereof comprising: sourcing or driving a current across the conductors in a direction where the device(s) do not interfere with measurements of the conductors; measuring the voltage developed across the conductors; and comparing that voltage to a predetermined value stored at the devices that represents excessive shunting across the conductors where the direction for sourcing or driving a current or voltage is opposite to the direction for powering the devices(s).

27. A method as in claim 25 which includes using field effect transistors to open circuit the sections of the conductors.

28. A method as in claim 25 where the source or drive signal is pulsed on and off at least once.

29. A method as in claim 25 which includes maintaining sections of the at least one conductor in an open circuit condition if an excessive shunt condition is present.

30. A method as in claim 25 which includes incorporating isolation circuitry into at least some of the devices.

31. A method as in claim 30 where all devices of a selected plurality contain isolation circuitry.

32. A communications system comprising:

a communications link;

a plurality of substantially identical electrical units coupled to the link wherein each of the units includes circuitry for carrying out a primary non-test function, circuitry for open circuiting the link and circuitry for testing the link for a fault condition when open circuited.

33. A system as in claim 32 wherein the units are selected from a class which includes fire detectors, motion detectors, position-detectors, gas detectors, and condition indicating output devices.

34. A system as in claim 32 wherein at least some of the units include ambient condition sensors and the primary function comprises sensing the respective ambient condition.

35. A system as in claim 19 wherein the one communication line is open circuited simultaneously at the plurality of locations.

36. A method as in claim 1 wherein the operational units comprise ambient condition detectors and including:

monitoring respective ambient conditions adjacent to the units.

37. A method as in claim 10 further comprising generating a trouble indication on the communication line, after establishing the location of the fault.

38. A method as in claim 37 wherein the trouble indication includes the address of the device proximate the fault.

39. A method as in claim 19 further comprising generating a trouble indication on the communication link, after determining the selected device open circuiting the communication positive wire is coincident with the measured current flowing the ground to the selected unit.

40. A method as in claim 39 wherein the trouble indication includes the address of the device proximate the fault.

* * * * *